United States Patent
Jeon et al.

(10) Patent No.: US 7,801,162 B2
(45) Date of Patent: Sep. 21, 2010

(54) GATEWAY DEVICE, NETWORK SYSTEM AND DATA CONVERTING METHOD APPLIED TO VEHICLE USING PLURALITY OF NETWORK PROTOCOL DIFFERENT FROM EACH OTHER

(75) Inventors: Jae Wook Jeon, Suwon (KR); Suk Hyun Seo, Suwon (KR); Tae Yoon Moon, Suwon (KR); Jin Ho Kim, Suwon (KR)

(73) Assignee: Sungkyunkwan University Foundation for Corporate Collaboration, Cheoncheon-Dong, Jangan-Gu, Suwon-Si, Gyeonggi-Do (KR)

( * ) Notice: Subject to any disclaimer, the term of this patent is extended or adjusted under 35 U.S.C. 154(b) by 322 days.

(21) Appl. No.: 12/015,356

(22) Filed: Jan. 16, 2008

(65) Prior Publication Data

US 2008/0304499 A1 Dec. 11, 2008

(51) Int. Cl.
*H04L 12/56* (2006.01)
(52) U.S. Cl. ..................................................... 370/402
(58) Field of Classification Search .................. None
See application file for complete search history.

(56) References Cited

U.S. PATENT DOCUMENTS 7,353,120 B2 * 4/2008 Enta ............................ 702/58

2006/0274467 A1 * 12/2006 Nagasawa .................... 361/62
2007/0069734 A1 * 3/2007 Bertness ..................... 324/411

FOREIGN PATENT DOCUMENTS

| KR | 10-2003-0060585 | 7/2003 |
| KR | 10-2006-0003392 | 1/2006 |

OTHER PUBLICATIONS

FlexNode—Rapid Prototyping For FlexRay Peter Reinstadler Philipp Komhard Sep. 23, 2004.*

* cited by examiner

*Primary Examiner*—Hong Cho
*Assistant Examiner*—Ajay P Cattungal
(74) *Attorney, Agent, or Firm*—Lexyoume IP Group, PLLC.

(57) ABSTRACT

The present invention relates to a gateway device, a network system and a data converting method using a plurality of network protocols different from each other. A gateway device includes a first communication controller connected to first device via a first bus in accordance with a first network protocol to exchange data with the first device in accordance with the first network protocol, a second communication controller connected to second device via a second bus in accordance with a second network protocol different from the first network protocol to exchange the data with the second device in accordance with the second network protocol, and a control unit interconverting the data in accordance with the first network protocol and the data in accordance with the second network protocol into each other so that the data is exchanged between the first device and the second device.

6 Claims, 4 Drawing Sheets

GATEWAY DEVICE, NETWORK SYSTEM AND DATA CONVERTING METHOD APPLIED TO VEHICLE USING PLURALITY OF NETWORK PROTOCOL DIFFERENT FROM EACH OTHER

BACKGROUND OF THE INVENTION

1. Field of the Invention

The present invention relates to a gateway device, a network system and a data converting method applied to a vehicle using a plurality of network protocols different from each other; and, more particularly, to a gateway device, a network system and a data converting method capable of integratedly managing and distributively controlling networks with reliability by exchanging data between networks using protocols different from each other.

2. Background of the Related Art

As public vehicles such as automobiles and buses, or military vehicles (hereinafter, referred to as 'vehicle') become to gradually develop in function and quality, the demand for the intelligent technology of the vehicles has been increased.

Generally, in order to realize an intelligent vehicle, state information such as a position or a speed of the vehicle and environmental information for the outside of the vehicle should be recognized and detected in real time, and the vehicle should be controlled semiautomatically or automatically so as to prevent an accident.

For this reason, the intelligent vehicles requires intelligent sensing and control algorithms such as a driver assistance system for controlling a part of the vehicle for driver's convenience or a collision warning system for providing information to a driver and warning an endangerment. In particular, as the intelligent vehicle has been evolved to a high level, the number of additional electronic components such as an acceleration sensor, a temperature sensor, a radar sensor, various control motor and the like of the vehicle also has been rapidly increased.

A vehicle wiring system (Harness system) in which an electronic component such as a sensor or an actuator, an ECU (Electronic Control Unit) or a switch is one-on-one connected to each other by the use of cables was applied to an initial intelligent vehicle. An increment in the number of electronic components or switches led to an increment in the number of cables, thereby inducing the complexity of a wiring system, making maintenance of the vehicle or addition of new functions difficult and increasing the weight of the vehicle to lower a driving performance by increasing the weight thereof.

In order to solve these problems, an in-vehicle network system in which the electronic components, the ECU and the switch are connected to each other by the use of long and fine shared cables had been proposed and studied. As a result, a LIN (Local Interconnect Network) protocol and a CAN (Controller Area Network) protocol which are network protocols for vehicle control had been developed. Further, a FlexRay protocol has been recently developed.

As the in-vehicle network system has been developed and actually applied to the vehicle, various electronic components developed for driver's convenience and safety become easy to install without modifying the vehicle wiring system, a vehicle performance such as a fuel efficiency is improved due to a decrease in the number of used cables, and concomitant effects such as securement of an additional space or simplification of an assembly process and an increment in maintenance efficiency are obtained.

However, there was a restriction to use one network protocol for forming a network for communication between the electronic components in the conventional in-vehicle network system. That is to say, data can be interchanged between two or more network systems using the same network protocol, but the data cannot be interchanged between network systems using network protocols different from each other due to data structures of each network protocols different from each other.

Accordingly, in case that a plurality of network systems are applied to the interior of the vehicle, there is a restriction to use the same network protocol between network systems requiring interchange of the data and there is a demerit that the efficiency in configuration of the in-vehicle network system will decrease.

Also, in case that data interchange is required between two network systems using network protocols different from each other, which are designed on the assumption that the data is not interchanged between the two systems, there is an inconvenience that one network system should be redesigned to match with the other network protocol.

SUMMARY OF THE INVENTION

Technical Problem

It is, therefore, an object of the present invention to a gateway device, a network system and a data converting method capable of integratedly managing and distributively controlling networks with reliability by exchanging data between networks using different protocols.

Technical Solution

In order to achieve the above-mentioned object, in accordance with an aspect of the present invention, there is provided a gateway device applied to a vehicle using a plurality of network protocols different from each other including a first communication controller connected to at least one first device via a first bus in accordance with a first network protocol to exchange data with the first device in accordance with the first network protocol, a second communication controller connected to at least one second device via a second bus in accordance with a second network protocol different from the first network protocol to exchange the data with the second device in accordance with the second network protocol, and a control unit interconverting the data in accordance with the first network protocol and the data in accordance with the second network protocol into each other so that the data is exchanged between the first device and the second device.

Herein, the gateway device further includes a third communication controller connected to at least one third device via a third bus in accordance with at least one third network protocol different from each other and different from the first network protocol and the second network protocol to exchange data with the third device in accordance with the third network protocol, wherein the control unit interconverts the data in accordance with the first network protocol, the data in accordance with the second network protocol and the data in accordance with the third network protocol into each other so that the data is exchanged among the first device, the second device and the third device.

The first network protocol, the second network protocol and the third network protocol includes any one of a LIN (Local Interconnect Network) protocol, a CAN (Control Area Network) protocol and a FlexRay protocol.

The control unit may include a LIN/CAN converting unit interconverting data in accordance with the LIN (Local Interconnect Network) protocol and data in accordance with the CAN (Control Area Network) protocol into each other, a CAN/FlexRay converting unit interconverting the data in accordance with the CAN (Control Area Network) protocol and data in accordance with the FlexRay protocol into each other, and a FlexRay/LIN converting unit interconverting the data in accordance with the FlexRay protocol and the data in accordance with the LIN (Local Interconnect Network) protocol into each other.

The gateway device may further include a LIN control unit outputting the data in accordance with the LIN (Local Interconnect Network) protocol, which is converted by the LIN/CAN converting unit and the FlexRay/LIN converting unit through one of the first communication controller, the second communication controller and the third communication controller, and analyzing the data in accordance with the LIN (Local Interconnect Network) protocol, which is inputted through one of the first communication controller, the second communication controller and the third communication controller to output the analyzed data to the one of the LIN/CAN converting unit and the FlexRay/LIN converting unit, a CAN control unit outputting the data in accordance with the CAN (Control Area Network) protocol, which is converted by the LIN/CAN converting unit and the CAN/FlexRay converting unit through another of the first communication controller, the second communication controller and the third communication controller, and analyzing the data in accordance with the CAN (Control Area Network) protocol, which is inputted through another of the first communication controller, the second communication controller and the third communication controller to output the analyzed data to one of the LIN/CAN converting unit and the CAN/FlexRay converting unit, and a FlexRay control unit for outputting the data in accordance with the FlexRay protocol, which is converted by the CAN/FlexRay converting unit and the FlexRay/LIN converting unit through the other of the first communication controller, the second communication controller and the third communication controller, and analyzing the data in accordance with the FlexRay protocol, which is inputted through the other of the first communication controller, the second communication controller and the third communication controller to output the analyzed data to one of the CAN/FlexRay converting unit and the FlexRay/LIN converting unit.

Herein, the control unit may further include a LIN/CAN buffer in which the data converted by the LIN/CAN converting unit is temporarily stored, a CAN/FlexRay buffer in which the data converted by the CAN/FlexRay converting unit is temporarily stored, and a FlexRay/LIN buffer in which the data converted by the FlexRay/LIN converting unit is temporarily stored.

The first communication controller and the at least one first device, the second communication controller and the at least one second device, the third communication controller and the at least one third device each constitute a network having a plurality of nodes, the control unit further includes a network management which checks operation states of nodes of each network, and stores and manages information on the checked operation states of the nodes, and the LIN control unit, the CAN control unit and the FlexRay control unit delay the transmission of data to a node having an error or conversion of the data to be transmitted to the node having the error on the basis of the operation states of the nodes stored in the network management in conjunction with the network management.

The LIN control unit may include a LIN stack in which the data in accordance with the LIN (Local Interconnect Network) protocol to be converted into the data in accordance with the CAN (Control Area Network) protocol or the data in accordance with the FlexRay protocol by the LIN/CAN converting unit or the FlexRay/LIN converting unit is sequentially stored, and a LIN scheduler that determines a conversion order of the data in accordance with the LIN (Local Interconnect Network) protocol stored in the LIN stack on the basis of a predetermined degree of importance for the data in accordance with the LIN (Local Interconnect Network) protocol. The CAN control unit may include a CAN stack in which the data in accordance with the CAN (Control Area Network) protocol to be converted into the data in accordance with the LIN (Local Interconnect Network) protocol or the data in accordance with the FlexRay protocol by the LIN/CAN converting unit or the CAN/FlexRay converting unit is sequentially stored, and a CAN scheduler that determines a conversion order of the data in accordance with the CAN (Control Area Network) protocol stored in the CAN stack on the basis of a predetermined degree of importance for the data in accordance with the CAN (Control Area Network) protocol. The FlexRay control unit may include a FlexRay stack in which the data in accordance with the FlexRay protocol to be converted into the data in accordance with CAN (Control Area Network) protocol or the data in accordance with the LIN (Local Interconnect Network) protocol by the CAN/FlexRay converting unit or the FlexRay/LIN converting unit is sequentially stored, and a FlexRay scheduler that determines a conversion order of the data in accordance with the FlexRay protocol stored in the FlexRay stack on the basis of a predetermined degree of importance for the data in accordance with the FlexRay protocol.

Herein, the gateway device may further include a log information storing unit in which information on the data exchanged through the LIN control unit, the CAN control unit and the FlexRay control unit is recorded.

Meanwhile, in order to the above-mentioned object, in accordance with another aspect of the present invention, there is provided a network system of a vehicle using a plurality of network protocols different from each other including at least one first device connected to a bus in accordance with a first network protocol, at least one second device connected to a second bus in accordance with a second network protocol different form the first network protocol, and a gateway device exchanging data in accordance with the first network protocol via the first bus with the first device, exchanging data in accordance with the second network protocol vial the second bus with the second device, and interconverting the data in accordance with the first network protocol and the data in accordance with the second network protocol into each other so that the data is exchanged between the first device and the second device.

Herein, the network system may further include at least one third device connected to a third bus in accordance with at least one third network protocol different from each other and different from the first network protocol and the second network protocol, wherein the gateway device interconverts the data in accordance with the first network protocol, the data in accordance with the second network protocol and the data in accordance with the third network protocol so that the data is exchanged among the first device, the second device and the third device.

The gateway device may include a first communication controller exchanging the data in accordance with the first network protocol with the first device via a first bus, a second communication controller exchanging the data in accordance with the second network protocol with the second device via a second bus, a third communication controller for exchanging the data in accordance with the third network protocol with the third device via a third bus, and a control unit interconverting the data in accordance with the first network protocol, the data in accordance with the second network protocol and the data in accordance with the third network protocol exchanged through the first communication controller, the second communication controller and the third communication controller into each other so that the data is exchanged among the first device, the second device and the third device.

Herein, the first network protocol includes a LIN (Local Interconnect Network) protocol, the second network protocol includes a CAN (Control Area Network) protocol and the third network protocol include a FlexRay protocol.

The control unit may include a LIN/CAN converting unit interconverting data in accordance with the LIN (Local Interconnect Network) protocol and data in accordance with the CAN (Control Area Network) protocol into each other, a CAN/FlexRay converting unit interconverting the data in accordance with the CAN (Control Area Network) protocol and data in accordance with the FlexRay protocol into each other, and a FlexRay/LIN converting unit interconverting the data in accordance with the FlexRay protocol and the data in accordance with the LIN (Local Interconnect Network) protocol.

Herein, the network system may further include a LIN control unit outputting the data in accordance with the LIN (Local Interconnect Network) protocol, which is converted by the LIN/CAN converting unit and the FlexRay/LIN converting unit through one of the first communication controller, the second communication controller and the third communication controller, and analyzing the data in accordance with the LIN (Local Interconnect Network) protocol, which is inputted through one of the first communication controller, the second communication controller and the third communication controller to output the analyzed data to the one of the LIN/CAN converting unit and the FlexRay/LIN converting unit, a CAN control unit outputting the data in accordance with the CAN (Control Area Network) protocol, which is converted by the LIN/CAN converting unit and the CAN/FlexRay converting unit through another of the first communication controller, the second communication controller and the third communication controller, and analyzing the data in accordance with the CAN (Control Area Network) protocol, which is inputted through another of the first communication controller, the second communication controller and the third communication controller to output the analyzed data to one of the LIN/CAN converting unit and the CAN/FlexRay converting unit, and a FlexRay control unit outputting the data in accordance with the FlexRay protocol, which is converted by the CAN/FlexRay converting unit and the FlexRay/LIN converting unit through the other of the first communication controller, the second communication controller and the third communication controller, and analyzing the data in accordance with the FlexRay protocol, which is inputted through the other of the first communication controller, the second communication controller and the third communication controller to output the analyzed data to one of the CAN/FlexRay converting unit and the FlexRay/LIN converting unit.

The control unit may further include a LIN/CAN buffer in which the data converted by the LIN/CAN converting unit is temporarily stored, a CAN/FlexRay buffer in which the data converted by the CAN/FlexRay converting unit is temporarily stored, and a FlexRay/LIN buffer in which the data converted by the FlexRay/LIN converting unit is temporarily stored.

Herein, the first communication controller and at least one first device, the second communication controller and at least one second device, the third communication controller and at least one third device each constitutes a network having a plurality of nodes. The control unit further includes a network management which checks operation states of nodes of each network, and stores and manages information on the checked operation states of the nodes. The LIN control unit, the CAN control unit and the FlexRay control unit delay the transmission of data to a node occurring an error or the conversion of the data to be transmitted to the corresponding node on the basis of the operation states of each of the nodes stored in the network management in conjunction with the network management.

The LIN control unit may include a LIN stack in which the data in accordance with the LIN (Local Interconnect Network) protocol to be converted into the data in accordance with the CAN (Control Area Network) protocol or the data in accordance with the FlexRay protocol by the LIN/CAN converting unit or the FlexRay/LIN converting unit is sequentially stored, and a LIN scheduler for determining a conversion order of the data in accordance with the LIN (Local Interconnect Network) protocol stored in the LIN stack on the basis of a predetermined degree of importance for the data in accordance with the LIN (Local Interconnect Network) protocol. The CAN control unit may include a CAN stack in which the data in accordance with the CAN (Control Area Network) protocol to be converted into the data in accordance with the LIN (Local Interconnect Network) protocol or the data in accordance with the FlexRay protocol by the LIN/CAN converting unit or the CAN/FlexRay converting unit is sequentially stored, and a CAN scheduler for determining a conversion order of the data in accordance with the CAN (Control Area Network) protocol stored in the CAN stack on the basis of a predetermined degree of importance for the data in accordance with the CAN (Control Area Network) protocol. The FlexRay control unit may include a FlexRay stack in which the data in accordance with the FlexRay protocol to be converted into the data in accordance with CAN (Control Area Network) protocol or the data in accordance with the LIN (Local Interconnect Network) protocol by the CAN/FlexRay converting unit or the FlexRay/LIN converting unit is sequentially stored, and a FlexRay scheduler for determining a conversion order of the data in accordance with the FlexRay protocol stored in the FlexRay stack on the basis of a predetermined degree of importance for the data in accordance with the FlexRay protocol.

Herein, the gateway device may further include a log information storing unit in which information on the data exchanged through the LIN control unit, the CAN control unit and the FlexRay control unit is recorded.

In order to achieve the above-mentioned object, in accordance with a further aspect of the present invention, there is provided a data conversion method capable of exchanging data in accordance with a plurality of network protocols different from each other including receiving first data in accordance with a first network protocol via a first bus in accordance with the first network protocol, analyzing a destination node of the first data by analyzing a data frame structure of the received first data, converting the first data into second data in accordance with a second network protocol by determining the second network protocol which the destination node uses, and transmitting the converted second data to the destination node via a second bus in accordance with the second network protocol.

Herein, the first network protocol and the second network protocol include any one of a LIN (Local Interconnect Network) protocol, a CAN (Control Area Network) protocol and a FlexRay protocol.

EFFECT OF THE INVENTION

As described above, in accordance with the present invention, there are provided a gateway device, a network system and a data converting method capable of integratedly managing and distributively controlling networks with reliability by exchanging data between networks using protocols different from each other.

DETAILED DESCRIPTION OF THE INVENTION

Hereinafter, preferred embodiments of the present invention will be described in more detail with reference to the accompanying drawings.

Figure 1:
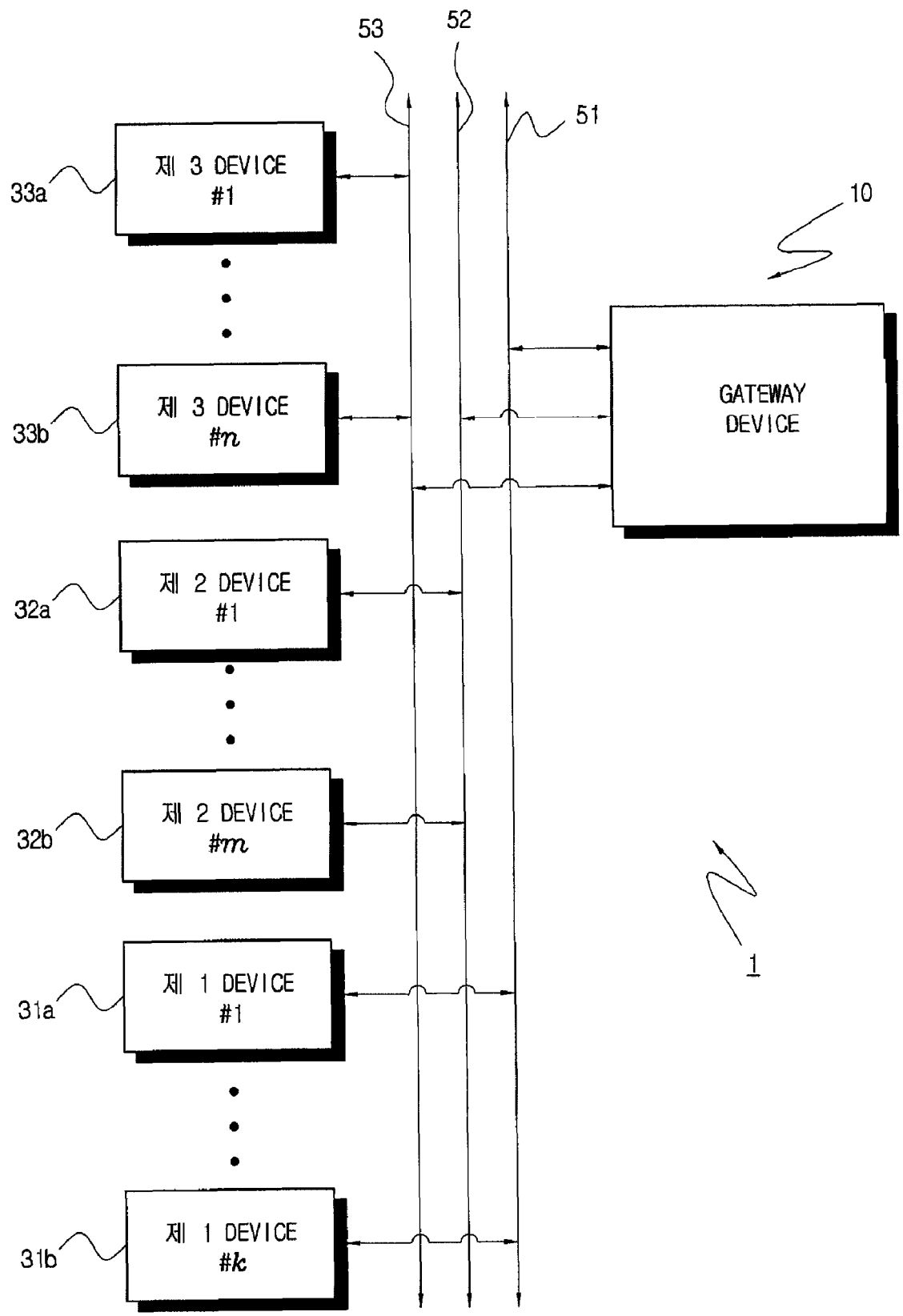
FIG. 1 is a diagram showing a configuration of a network system in accordance with an embodiment of the present invention.

A network system 1 according to the present invention integratedly manages a network using a plurality of network protocols different from each other. As shown in FIG. 1, the network system 1 according to the present invention includes one or more first devices 31a and 31b, one or more second devices 32a and 32b, one or more third devices 33a and 33b and a gateway device 10.

The first devices 31a and 31b interchange data therebetween in accordance with a first network protocol and are interconnected to each other via a first bus 51. The second devices 32a and 32b interchange the data therebetween in accordance with a second network protocol and are interconnected to each other via a second bus 52. The third devices 33a and 33b interchange the data therebetween in accordance with a third network protocol and are interconnected to each other via a third bus 53.

Herein, the first network protocol, the second network protocol and the third network protocol are set in the form of network protocols different from each other. In the present invention, an embodiment that the first network protocol is a LIN (Local Interconnect Network) protocol, the second network protocol is a CAN (Controller Area Network) protocol and the third network protocol a FlexRay protocol is described as an example.

The gateway device 10 is connected to the first devices 31a and 31b via the first bus 51 and exchanges the data with the first devices 31a and 31b in accordance with the first network protocol, that is, the LIN protocol. The gateway device 10 is connected to the second devices 32a and 32b via the second bus 52 and exchanges the data with the second devices 32a and 32b in accordance with the second network protocol, that is, the CAN protocol. The gateway device 10 is connected to the third devices 33a and 33b via the third bus 53 and exchanges the data with the third devices 33a and 33b in accordance with the third protocol, that is, the FlexRay protocol. Herein, it is explained by defining the data exchanged in accordance with the LIN protocol as LIN data, the data exchanged in accordance with the CAN protocol as CAN data and the data exchanged in accordance with the FlexRay protocol as FlexRay data.

Meanwhile, the gateway device 10 converts the LIN data, the CAN data and the FlexRay data into each other so that the first devices 31a and 31b, the second devices 32a and 32b, and the third devices 33a and 33b interchange the data therebetween.

For example, the LIN data transmitted from the first devices 31a and 31b to the second devices 32a and 32b is transmitted from the first devices 31a and 31b to the gateway device 10 via the first bus 51. The gateway device 10 analyzes the LIN data transmitted from the first devices 31a and 31b and creates the CAN data. The gateway device 10 transmits the created CAN data to the second devices 32a and 32b via the second bus 52. In the same manner, the first devices 31a and 31b and the third devices 33a and 33b interchange the data therebetween, and the second devices 32a and 32b and the third devices 33a and 33b interchange the data therebetween.

According to the above-mentioned configuration, in the network system 1 according to the present invention, the data can be exchanged between networks using network protocols different from each other. Accordingly, individual networks using the network protocols different from each other can be integratedly managed and the reliability of distributive control used for vehicle control can be secured.

Hereinafter, the gateway device 10 according to the present invention will be described in detail with reference to FIG. 2.

Figure 2:
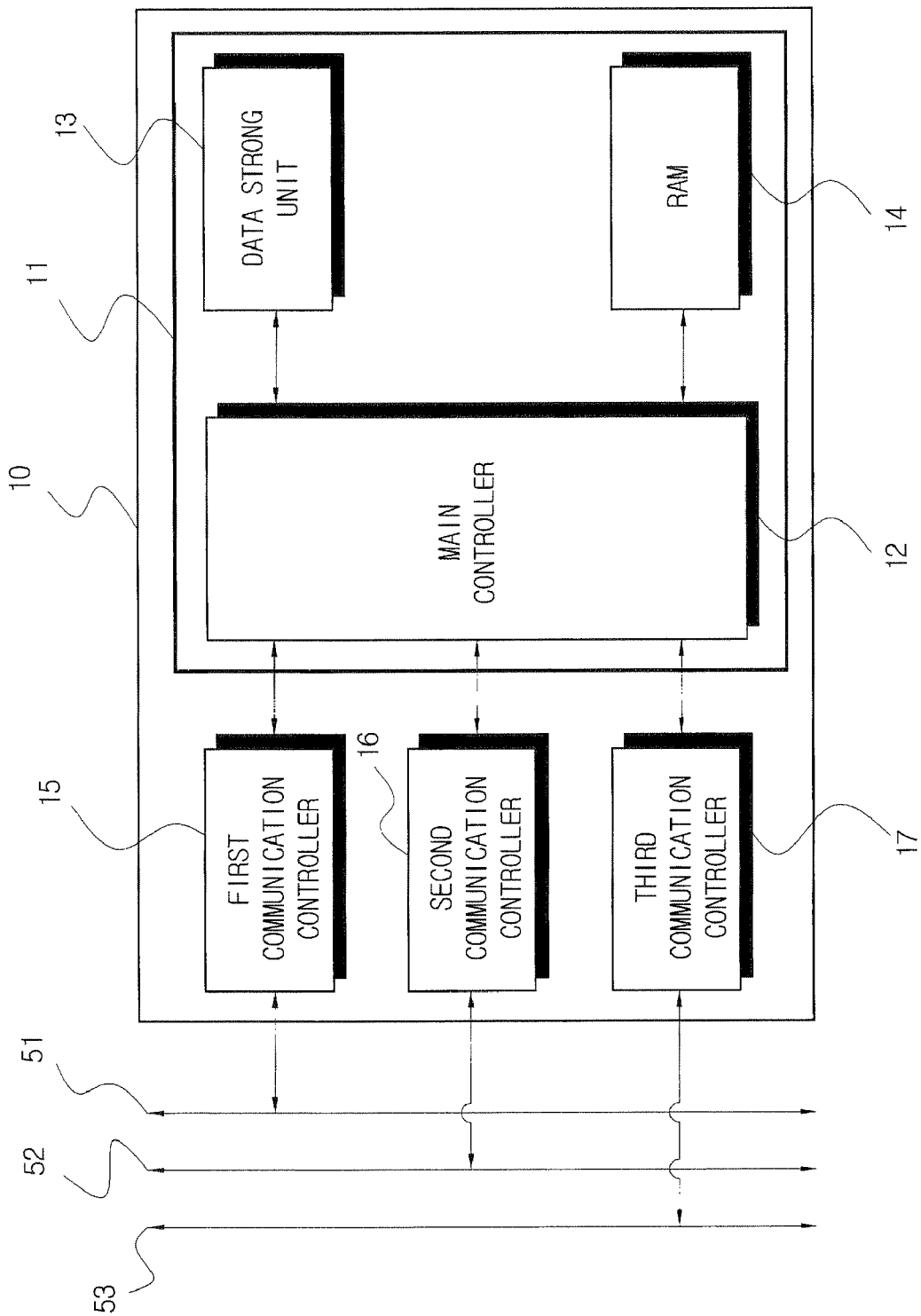
FIG. 2 is a diagram showing an example of a gateway device of FIG. 1.

As shown in FIG. 2, the gateway device 10 according to the present invention includes a first communication controller 15, a second communication controller 16, a third controller 17 and a control unit 11.

The first communication controller 15 is connected to the first devices 31a and 31b via the first bus 51 and exchanges the LIN data with first devices 31a and 31b in accordance with the first network protocol, that is, the LIN protocol as described in the above-mentioned embodiment.

The second communication controller 16 is connected to the second devices 32a and 32b via the second bus 52, and exchanges the CAN data with the second devices 32a and 32b in accordance with the second network protocol, that is, the CAN protocol as described in the above-mentioned embodiment.

The third communication controller 17 is connected to the third devices 33a and 33b via the third bus 53, and exchanges the FlexRay data with the third devices 33a and 33b in accordance with the third network protocol, that is, the FlexRay protocol as described in the above-mentioned embodiment.

The control unit 11 converts the LIN data, the CAN data and the FlexRay data exchanged through the first communication controller 15, the second communication controller 16 and the third communication controller 17 into each other so that the first devices 31a and 31b, the second devices 32a and 32b, and the third devices 33a and 33b exchanges the data therebetween.

Herein, the control unit 11 according to the present invention may include a main controller 12, a data storing unit 13 and a RAM 14 as shown in FIG. 2. Herein, the main controller 12 includes a hardware configuration and a software configuration to carry out a function of the control unit 11 and operates a program for operating the software configuration by the use of the data storing unit 13 and the RAM 14.

The data storing unit 13 stores a software program required to drive the main controller 12 and stores various data created in the course of operating the main controller 12. The data storing unit 13 may be provided in the form of a flash memory.

The RAM 14 provides a space where the program required to drive the main controller 12 and other data are temporarily stored.

Figure 3:
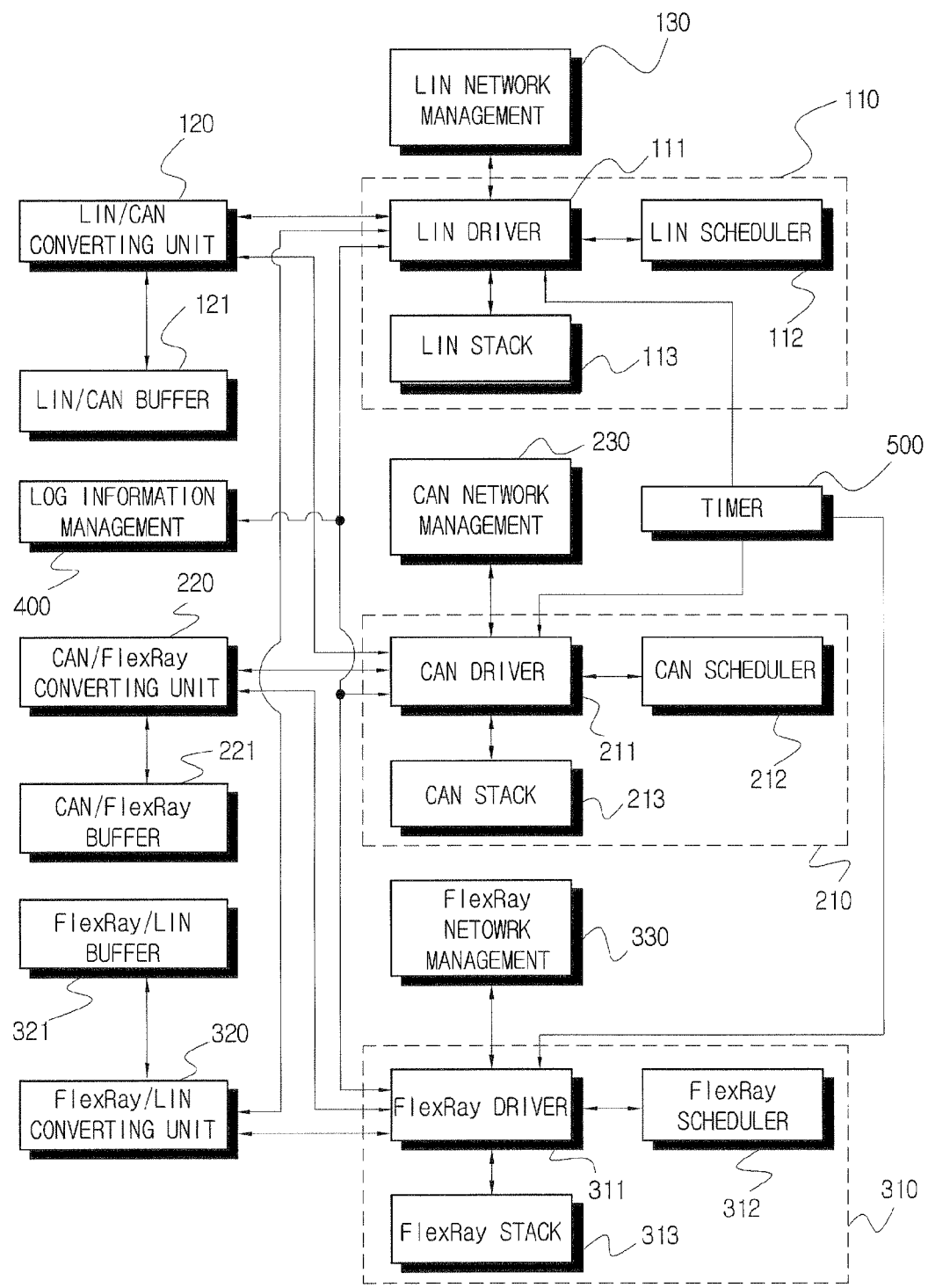
FIG. 3 is a diagram showing an example of a main controller of FIG. 2.

Hereinafter, the control unit 11 according to the present invention will be described in detail with reference to FIG. 3. Herein, a function of each configuration of the control unit 11 shown in FIG. 3 is realized by the main controller 12. The function of each configuration of the control unit 11 can be realized through the hardware configuration and the software configuration.

The control unit 11 according to the present invention may include a LIN/CAN converting unit 120 interconverting the LIN data exchanged in accordance with the LIN protocol and the CAN data exchanged in accordance with the CAN protocol into each other, a CAN/FlexRay converting unit 220 interconverting the CAN data and the FlexRay data exchanged in accordance with the FlexRay protocol into each other, and a FlexRay/LIN converting unit 320 interconverting the FlexRay data and the LIN data into each other.

The control unit 11 may include a LIN control unit 110 connected to the LIN/CAN converting unit 120, the FlexRay/LIN converting unit 320 and the first communication controller 15, a CAN control unit 210 connected to the LIN/CAN converting unit 120, the CAN/FlexRay converting unit 220 and the second communication controller 16, and a FlexRay control unit 310 connected to the CAN/FlexRay converting unit 220, a FlexRay/CAN converting unit and the third communication controller 17.

The LIN control unit 110 analyzes the LIN data inputted through the first controller 15, the LIN control unit 110 outputs the LIN data to the LIN/CAN converting unit 120 when the LIN data is the data transmitted to the second devices 32*a* and 32*b*, and outputs the LIN data to the FlexRay/LIN converting unit 320 when the LIN data is the data transmitted to the third devices 33*a* and 33*b*.

At this time, the LIN/CAN converting unit 120 (or the FlexRay/LIN converting unit 320) that receives the LIN data from the LIN control unit 110 converts the LIN data into the CAN data (or the FlexRay data) and outputs the CAN data (or the FlexRay data) to the CAN control unit 210 (or the FlexRay control unit 310). Herein, the CAN control unit 210 (or the FlexRay control unit 130) that receives the CAN data (or the FlexRay data) from the LIN/CAN converting unit 120 (or the FlexRay/LIN converting unit 320) analyzes the CAN data (or the FlexRay data) and outputs the CAN data (or the FlexRay data) to the second devices 32*a* and 32*b* (or the third devices 33*a* and 33*b*) as the destination via the second communication controller 16 (or the third communication controller 17).

And also, the LIN control unit 110 analyzes the LIN data input with being converted by the LIN/CAN converting unit 120 (or the FlexRay/LIN converting unit 320) and transmits the LIN data as the destination of the LIN data to the first devices 31*a* and 31*b* via the first communication controller 15.

Similarly as the above-mentioned method, the CAN control unit 210 (or the FlexRay control unit 310) also outputs the CAN data (or the FlexRay data) converted by the LIN/CAN converting unit 120 and the CAN/FlexRay converting unit 220 (or the CAN/FlexRay converting unit 220 and the FlexRay/LIN converting unit 320) to the second devices 32*a* and 32*b* (or the third devices 33*a* and 33*b*) via the second controller 16 (or the third controller 17), and analyzes the CAN data (or the FlexRay data) input via the second communication controller 16 (or the third controller 17), and outputs the CAN data (or the FlexRay data) to the LIN/CAN converting unit 120 and the CAN/FlexRay converting unit 220 (or the CAN/FlexRay converting unit 220 and the FlexRay/LIN converting unit 320).

Herein, as shown in FIG. 3, the control unit 11 according to the present invention may include a LIN/CAN buffer 121 where the data converted by the LIN/CAN converting unit 120, that is, the LIN data or the CAN data is temporarily stored, a CAN/FlexRay buffer 221 where the data converted by the CAN/FlexRay converting unit 220, that is, the CAN data and the FlexRay is temporarily stored, and a FlexRay/LIN buffer 321 where the data converted by the FlexRay/LIN converting unit 320, that is, the FlexRay data and the LIN data is temporarily stored.

Meanwhile, the network system 1 according to the present invention may be constituted of a network (hereinafter, referred to as 'a first network') where the first communication controller 15, and the first devices 31*a* and 31*b* form a plurality of nodes. Further, the network system 1 is constituted of a network (hereinafter, 'a second network' and 'a third network') where the second communication controller 16 and the third communication controller 17, and the second devices 32*a* and 32*b* and the third devices 33*a* and 33*b* form a plurality of nodes, respectively.

And, the control unit 11 of the gateway device 10 may include a LIN network management 130, a CAN network management 230 and a FlexRay network management 330 that checks operation states of the nodes of each of the first network, the second network and the third network, and stores and manages information on a node condition of each network node.

Herein, the LIN network management 130 the CAN network management 230 and the FlexRay network management 330 operate under an OS (Operating System), for example, an OSEK/VDX and operates under an environment where the OSEK/VDX is ported to an embedded system for realizing the network system according to the present invention. Herein, another software configuration of the main controller 12 according to the present invention may be provided to operate under the OSEK/VDX environment.

And, the LIN control unit 110, the CAN control unit 210 and the FlexRay control unit 310 can delay the transmission of the data to a node having an error or delay the conversion of the data to be transmitted to the node having the error, that is, the conversion of the data performed by the LIN/CAN converting unit 120, the CAN/FlexRay converting unit 220 and the FlexRay/CAN converting unit on the basis of the operation condition of each node stored in each of the LIN network management 130, the CAN network management 230 and the FlexRay network management 330 in conjunction with the LIN network management 130, the CAN network management 230 and the FlexRay network management 330. Therefore, it becomes possible to minimize unnecessary operations and a waste of resources caused by an attempt to transmit the data to the node having the error.

Herein, in the present invention, as shown in FIG. 3, although the LIN network management 130, the CAN network management 230 and the FlexRay network management 330 are provided independently of each other, but the network node condition in accordance with each protocol can be checked and managed by one integrated network management.

Meanwhile, as shown in FIG. 3, the LIN control unit 110 may include a LIN driver 111 that carries out the above-mentioned LIN data exchanging function, and a LIN stack 113 where the data received via the first communication controller 15, that is, the LIN data to be converted into the CAN data or the FlexRay data by the LIN/CAN converting unit 120 or the FlexRay/LIN converting unit 320 is sequentially stored. The LIN control unit 110 may include a LIN scheduler 112 for determining a conversion order of the LIN data stored in the LIN stack 113 on the basis of a predetermined degree of importance for the LIN data.

Herein, the LIN data is stored in the LIN stack 113 in accordance with an order received via the first communication controller 15. The LIN driver 111 controls the LIN data having the same degree of importance in a predetermined range so that the LIN data is converted by the LIN/CAN converting unit 120 or the FlexRay/LIN converting unit 320 in accordance with the order stored in the LIN stack 113.

At this time, the LIN scheduler 112 determines a processing order of the LIN data in accordance with the importance so that the LIN data having the higher degree of importance in preference to the previously stored LIN data when the LIN data having the higher degree of importance in which to a weighted value is applied to data for performing an operation related to a safety of the vehicle such as vehicle driving, that is, the previously set importance is received and stored in the LIN stack 113.

Similarly as the LIN control unit 110, the CAN control unit 210 may include a CAN driver 211 that carries out the above-mentioned CAN data exchanging function, and an CAN stack 213 where the data received via the second communication controller 16, that is, the CAN data to be converted into the LIN data or the FlexRay data by the LIN/CAN converting unit 120 or the CAN/FlexRay converting unit 220 is sequentially stored. The CAN control unit 210 may include a CAN scheduler 212 for determining a conversion order of the CAN data stored in the CAN stack 213 on the basis of the degree of importance previously set for the CAN data.

And, the FlexRay control unit 310 may include a FlexRay driver 311 that carries out the above-mentioned FlexRay data exchanging function, and a FlexRay stack 313 where the data received via the third communication controller 17, that is, the FlexRay data to be converted into the CAN data or the LIN data by the CAN/FlexRay converting unit 220 or the FlexRay/LIN converting unit 320 is sequentially stored. The FlexRay control unit 310 may include a FlexRay scheduler 312 for determining a conversion order of the FlexRay data stored in the FlexRay stack 313 on the basis of the degree of importance previously set for the FlexRay data.

As described above, the data having the higher importance is preferentially processed according to determination of the processing order by the LIN schedule 112, the CAN schedule 212 and the FlexRay scheduler 312, whereby safe driving the vehicle can be secured.

Meanwhile, as shown in FIG. 3 the gateway device 10 according to the present invention may further include a log information storing unit 400 where information on the LIN data, the CAN data and the FlexRay data exchanged by the LIN control unit 110, the CAN control unit 210 and the Flex Ray control unit 310 is recorded. Therefore, it is possible to confirm information on a node or a device where an error occurs or information on a node or a device where data transmission is delayed by analyzing data transmitted and received through the gateway device 10 on the basis of the information on the data recorded in the log information storing unit 400.

Herein, undescribed reference numeral 500 of FIG. 3 represents a timer for synchronization of internal constituent members of the control 11.

Figure 4:
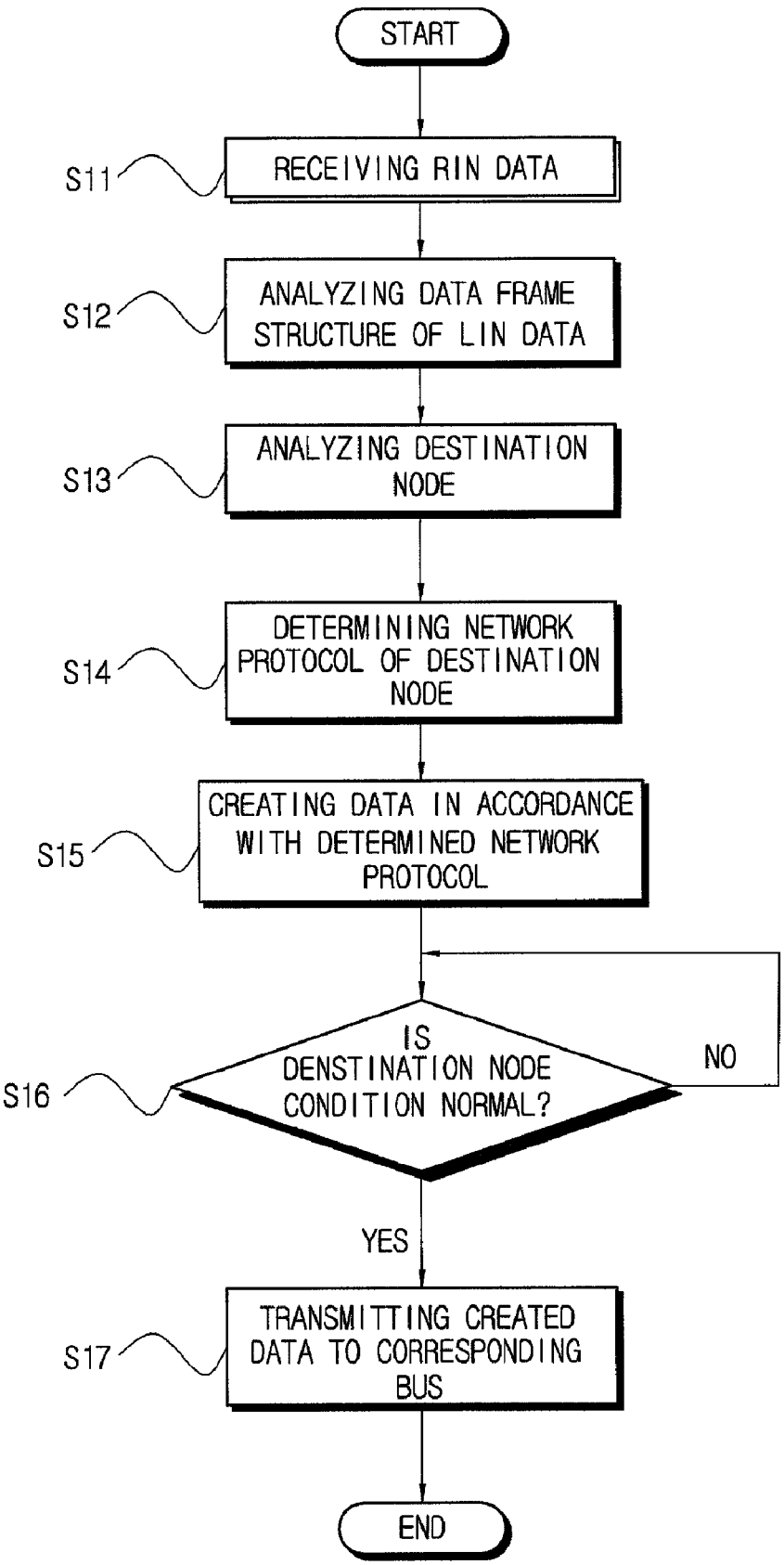
FIG. 4 is a flow chart illustrating a data conversion procedure by a network system in accordance with another embodiment of the present invention.

Hereinafter, a method in which the gateway device 10 according to the present invention converts data between network protocols different from each other will be described with reference to FIG. 4.

Herein, an embodiment that the above-mentioned LIN data is received to the gateway device and is converted into the CAN data or the FlexRay data is described as an example.

First, when the LIN data is received via the first bus 51 in accordance with the LIN protocol at step S11, a data frame structure of the LIN data is analyzed at step S12. For example, information such as data ID, actual data, a data length and the like is classified by classifying the LIN data for the number of bits defined in a specification of the LIN protocol. At this time, it is recognized that the data ID indicates a destination node, whereby the destination node is analyzed at step S13. Herein, in case that the destination node is a node to which the second devices 32*a* and 32*b* using the CAN protocol, a network protocol of the destination node, that is, the CAN protocol is determined at step S14 and the information such as the data ID, the actual data and the data length classified for each the number of bits is stored in the LIN/CAN buffer 121.

Then, the LIN/CAN converting unit 120 creates the CAN data in accordance with the CAN protocol which is the network protocol of the destination node by using the information such as the data ID, the actual data and the data length and the like stored in the LIN/CAN buffer 121 at step S15.

Therefore, the CAN data created by the LIN/CAN converting unit 120 is transferred to the CAN control unit 210. At this time, after the CAN control unit 210 determines whether or not the condition of the destination node of the CAN data is normal at step S16, when it is normal, the CAN control unit 210 transmits the CAN data to the second bus 52 at step S17.

In the above-mentioned embodiments, an embodiment that the network system 1 and the gateway device 10 according to the present invention interconvert the data in accordance with three different network protocols was described as an example, but they may interconvert data in accordance with two or four or more different network protocols.

As described above, although the preferred embodiments of the present invention are described in detail, the appended claims of the present invention are limited to the preferred embodiments and it will be apparent to those skilled in the art that various changes and modifications may be made without departing from the scope of the present invention as defined in the appended claims.

What is claimed is:

1. A gateway device applied to a vehicle using a Local Interconnect Network (LIN) protocol, a Control Area Network (CAN) protocol, and a FlexRay protocol, the gateway device comprising:
   a first communication controller connected to a first device via a first bus in accordance with the LIN protocol to exchange data with the first device in accordance with the LIN protocol, wherein the first communication controller and the first device constitute a first network having a plurality of nodes;
   a second communication controller connected to a second device via a second bus in accordance with the CAN protocol to exchange data with the second device in accordance with the CAN protocol, wherein the second communication controller and the second device constitute a second network having a plurality of nodes;
   a third communication controller connected to a third device via a third bus in accordance with the FlexRay protocol to exchange data with the third device in accordance with the FlexRay protocol, wherein the third communication controller and the third device constitute a third network having a plurality of nodes; and a control unit interconverting data in accordance with the LIN protocol, data in accordance with the CAN protocol and data in accordance with the FlexRay protocol into each other so that data is exchanged between the first device, the second device and the third device, wherein the control unit includes a LIN/CAN converting unit interconverting data in accordance with the LIN protocol and data in accordance with the CAN protocol into each other, a CAN/FlexRay converting unit interconverting data in accordance with the CAN protocol and data in accordance with the FlexRay protocol into each other, a FlexRay/LIN converting unit interconverting data in accordance with the FlexRay protocol and data in accordance with the LIN protocol into each other, a LIN control unit (a) outputting data in accordance with the LIN protocol, which is to be subsequently converted by at least one of the LIN/CAN converting unit and the FlexRay/LIN converting unit, (b) analyzing LIN data received from at least one of the LIN/CAN converting unit and the FlexRay/LIN converting unit and (c) transmitting analyzed LIN data to the first device via the first communication controller, a CAN control unit (a) outputting data in accordance with the CAN protocol, which is to be subsequently converted by at least one of the LIN/CAN converting unit and the CAN/FlexRay converting unit, (b) analyzing CAN data received from at least one of the LIN/CAN converting unit and the CAN/FlexRay converting unit and (c) transmitting analyzed CAN data to the second device via the second communication controller, a FlexRay control unit (a) outputting data in accordance with the FlexRay protocol, which is to be subsequently converted by at least one of the FlexRay/LIN converting unit and the CAN/FlexRay converting unit, (b) analyzing FlexRay data received from at least one of the FlexRay/LIN converting unit and the CAN/FlexRay converting unit and (c) transmitting analyzed FlexRay data to the third device via the third communication controller, a LIN/CAN buffer in which data converted by the LIN/CAN converting unit is temporarily stored, a CAN/FlexRay buffer in which data converted by the CAN/FlexRay converting unit is temporarily stored, a FlexRay/LIN buffer in which data converted by the FlexRay/LIN converting unit is temporarily stored, and a network manager which checks operation states of the plurality of nodes of the first, second and third networks and stores and manages information on operation states of the plurality of nodes of the first, second and third networks, wherein the LIN control unit, the CAN control unit and the FlexRay control unit delay at least one of (1) transmission of data to a node having an error and (2) conversion of data to be transmitted to a node having an error;

wherein the LIN control unit includes (a) a LIN stack that sequentially stores data in accordance with the LIN protocol which is to be converted into data in accordance with a different protocol, and (b) a LIN scheduler that determines a conversion order of data stored in the LIN stack on the basis of a predetermined degree of importance in accordance with the LIN protocol;

wherein the CAN control unit includes (a) a CAN stack that sequentially stores data in accordance with the CAN protocol which is to be converted into data in accordance with a different protocol, and (b) a CAN scheduler that determines a conversion order of data stored in the CAN stack on the basis of a predetermined degree of importance in accordance with the CAN protocol; and wherein the FlexRay control unit includes (a) a FlexRay stack that sequentially stores data in accordance with the FlexRay protocol which is to be converted into data in accordance with a different protocol, and (b) a FlexRay scheduler that determines a conversion order of data stored in the FlexRay stack on the basis of a predetermined degree of importance in accordance with the FlexRay protocol.

2. The gateway device of claim 1, further comprising a log information storing unit in which information on data exchanged through the LIN control unit, the CAN control unit and the FlexRay control unit is recorded.

3. The gateway device of claim 1, further comprising:

a log information storing unit in which information on data exchanged through the LIN control unit, the CAN control unit and the FlexRay control unit is recorded; and an analysis unit that analyzes data transmitted over the first network, the second network and the third network on the basis of the information recorded by the log information storing unit.

4. A network system of a vehicle using a Local Interconnect Network (LIN) protocol, a Control Area Network (CAN) protocol, and a FlexRay protocol, the system comprising:

a first device connected to a first bus in accordance with the LIN protocol;

a second device connected to a second bus in accordance with the CAN protocol;

a third device connected to a third bus in accordance with the FlexRay protocol;

a gateway device that includes a first communication controller exchanging data in accordance with the LIN protocol with the first device via the first bus, wherein the first communication controller and the first device constitute a first network having a plurality of nodes, a second communication controller exchanging data in accordance with the CAN protocol with the second device via the second bus, wherein the second communication controller and the second device constitute a second network having a plurality of nodes, a third communication controller for exchanging data in accordance with the FlexRay protocol with the third device via the third bus, wherein the third communication controller and the third device constitute a third network having a plurality of nodes, and a control unit interconverting data in accordance with the LIN protocol, data in accordance with the CAN protocol and data in accordance with the FlexRay protocol into each other so that data is exchanged between the first device, the second device and the third device, wherein the control unit further comprises (a) a LIN/CAN converting unit interconverting data in accordance with the LIN protocol and data in accordance with the CAN protocol into each other, (b) a CAN/FlexRay converting unit interconverting data in accordance with the CAN protocol and data in accordance with the FlexRay protocol into each other, (c) a FlexRay/LIN converting unit interconverting data in accordance with the FlexRay protocol and data in accordance with the LIN protocol into each other, (d) a LIN/CAN buffer in which data converted by the LIN/CAN converting unit is temporarily stored, (e) a CAN/FlexRay buffer in which data converted by the CAN/FlexRay converting unit is temporarily stored, and (f) a FlexRay/LIN buffer in which the data converted by the FlexRay/LIN converting unit is temporarily stored;

a LIN control unit (a) outputting data in accordance with the LIN protocol, which is to be subsequently converted by at least one of the LIN/CAN converting unit and the FlexRay/LIN converting unit, (b) analyzing LIN data received from at least one of the LIN/CAN converting unit and the FlexRay/LIN converting unit and (c) transmitting analyzed LIN data to the first device via the first communication controller;

a CAN control unit (a) outputting data in accordance with the CAN protocol, which is to be subsequently converted by at least one of the LIN/CAN converting unit and the CAN/FlexRay converting unit, (b) analyzing CAN data received from at least one of the LIN/CAN converting unit and the CAN/FlexRay converting unit and (c) transmitting analyzed CAN data to the second device via the second communication controller; and a FlexRay control unit (a) outputting data in accordance with the FlexRay protocol, which is to be subsequently converted by at least one of the FlexRay/LIN converting unit and the CAN/FlexRay converting unit, (b) analyzing FlexRay data received from at least one of the FlexRay/LIN converting unit and the CAN/FlexRay converting unit and (c) transmitting analyzed FlexRay data to the third device via the third communication controller;

wherein the LIN control unit includes (a) a LIN stack that sequentially stores data in accordance with the LIN protocol which is to be converted into data in accordance with a different protocol, and (b) a LIN scheduler that determines a conversion order of data stored in the LIN stack on the basis of a predetermined degree of importance in accordance with the LIN protocol;

wherein the CAN control unit includes (a) a CAN stack that sequentially stores data in accordance with the CAN protocol which is to be converted into data in accordance with a different protocol, and (b) a CAN scheduler that determines a conversion order of data stored in the CAN stack on the basis of a predetermined degree of importance in accordance with the CAN protocol;

wherein the FlexRay control unit includes (a) a FlexRay stack that sequentially stores data in accordance with the FlexRay protocol which is to be converted into data in accordance with a different protocol, and (b) a FlexRay scheduler that determines a conversion order of data stored in the FlexRay stack on the basis of a predetermined degree of importance in accordance with the FlexRay protocol; and wherein the control unit further comprises a network manager which checks operation states of the plurality of nodes of the first, second and third networks and stores and manages information on operation states of the plurality of nodes of the first, second and third networks, wherein the LIN control unit, the CAN control unit and the FlexRay control unit delay at least one of (1) transmission of data to a node having an error and (2) conversion of data to be transmitted to a node having an error.

5. The network system of claim 4, further comprising a log information storing unit in which information on the data exchanged through the LIN control unit, the CAN control unit and the FlexRay control unit is recorded.

6. The network system of claim 4, further comprising:

a log information storing unit in which information on data exchanged through the LIN control unit, the CAN control unit and the FlexRay control unit is recorded; and an analysis unit that analyzes data transmitted through the gateway device on the basis of the information recorded by the log information storing unit.

* * * * *